United States Patent

(12) United States Patent
Spitzer

(10) Patent No.: US 8,622,728 B2
(45) Date of Patent: Jan. 7, 2014

(54) BASE MOULD LIFT DAMPING

(75) Inventor: Thomas Spitzer, Wiesent (DE)

(73) Assignee: Krones AG (DE)

( * ) Notice: Subject to any disclaimer, the term of this patent is extended or adjusted under 35 U.S.C. 154(b) by 36 days.

(21) Appl. No.: 13/298,089

(22) Filed: Nov. 16, 2011

(65) Prior Publication Data

US 2012/0153545 A1    Jun. 21, 2012

(30) Foreign Application Priority Data

Nov. 18, 2010    (DE) .......................... 10 2010 051 544

(51) Int. Cl.
*B29C 49/56* (2006.01)

(52) U.S. Cl.
USPC ........... 425/214; 425/541; 425/540; 425/185; 425/188

(58) Field of Classification Search
USPC .......................... 425/541, 540, 214, 188, 185
See application file for complete search history.

(56) References Cited

U.S. PATENT DOCUMENTS

| | | | |
|---|---|---|---|
| 5,080,574 A | 1/1992 | Koga et al. ..................... | 425/526 |
| 6,805,548 B1 | 10/2004 | Evrard .......................... | 425/540 |
| 2005/0238753 A1 * | 10/2005 | Arakelyan et al. ............ | 425/540 |
| 2006/0032503 A1 | 2/2006 | Berthon-Jones et al. | 128/204.23 |
| 2008/0063742 A1 * | 3/2008 | Legallais et al. ........... | 425/451.4 |

FOREIGN PATENT DOCUMENTS

EP    0425388    2/1991    ............. B29C 49/06

OTHER PUBLICATIONS

German Search Report, Serial No. 10 2010 051 544.2, Aug. 8, 2011, 5 pgs.

* cited by examiner

*Primary Examiner* — Joseph S Del Sole
*Assistant Examiner* — Lawrence D Hohenbrink, Jr.
(74) *Attorney, Agent, or Firm* — Hayes Soloway P.C.

(57) ABSTRACT

Disclosed is a device for forming containers and a method for damped closing of a mold carrier unit and a base mold carrier of a blow mold for forming containers. The device includes at least one mold carrier unit for holding blow mold parts and a base mold carrier for holding a base mold and a base mold carrier lift device for moving the base mold carrier in conjunction with the movement of the mold carrier unit. The mold carrier unit includes at least two mold carriers which surround the container to be processed at least during a molding process. The base mold carrier covers a base area of the container to be treated. The base mold carrier lift device includes at least one first damping element for damping and limiting the vertical movement of the base mold carrier in relation to the mold carrier unit.

11 Claims, 3 Drawing Sheets

BASE MOULD LIFT DAMPING

BACKGROUND OF THE INVENTION

The present invention relates to a device for forming containers and a method of damped closing of a mould carrier unit and a base mould carrier of a blow mould for forming containers.

FIELD OF THE INVENTION

Blowmoulding/stretchmoulding machines and plants for forming plastic containers made for example from a preform are widely known from the prior art. These plants have a multiplicity of devices (also called blowing stations) for blowing and stretching containers which comprise at least one mould carrier unit consisting of two mould carriers and a base mould.

Such a blowmoulding machine for production of containers is described for example in U.S. 2008/0063742 A1.

The base mould which in conventional stretch-blowmoulding machines is arranged on a base mould carrier is moved by a corresponding lift device in the direction of the mould carrier unit during closing of this mould carrier unit, so that the mould carrier unit and the base mould finally move towards or against each other such that they form a wall surrounding the container to be moulded. The mould carrier unit then surrounds the side walls of the containers to be formed while the base mould covers the base area of the container.

During this targeted and usually unbraked and very fast movement of the base mould in the direction of the mould carrier unit, often a collision occurs between the base mould and the individual mould carriers whereby the individual components can be damaged. Consequently a perfect seal of the inner area, in which the container is formed, against the outer area formed by the wall comprising base mould and mould carrier unit, no longer exists.

Thus it is necessary to brake the movement of the base mould against the mould carrier unit in a controlled manner, for example with an impact-damping device.

Such impact-damping devices are described for example in WO 2006/032503 A2, wherein the machine disclosed here for moulding plastic comprises an impact-damping device as well as a moulding device and an actuator device. This impact-damping device comprises a pneumatic cylinder arranged between the swage and/or the die, and the respective activation device which moves the swage and the die into position. These impact-damping devices allow the maintaining of a constant pressure applied to the swage and die, and prevent for example overpressure which can be generated by damage to the moulding device. Consequently these impact-damping devices are merely pressure-regulating elements which do not however control the movement of the elements coming together, here the swage and die.

For merely even reduction of a closing speed for example EP 0 425 388 B1 describes a shock absorber which is adapted to receive a deceleration shaft arranged next to a lowering rod on a closing plate in a rotation injection moulding machine with a corresponding closing device to reduce the movement of the closing plate. However, here the contact between the closing elements is not limited.

Consequently the object of the present invention is to avoid such a collision of the base mould or base mould upper edge and mould carrier units or mould carrier lower edge in order to extend the useful life of the base mould and mould carrier and consequently be able to form containers more economically and efficiently.

SUMMARY OF THE INVENTION

The object is achieved by the present invention by means of a device for forming containers and a method for damped closing of a mould carrier unit and a base mould carrier of a blow mould for forming containers.

The device according to the invention for forming containers has at least one mould carrier unit to hold blowmoulding parts and a base mould carrier for holding a base mould and a base mould carrier lift device for moving the base mould carrier in conjunction with the movement of the mould carrier unit, wherein the mould carrier unit comprises at least two mould carriers which surround the container to be processed at least during a moulding process and wherein the base mould carrier by means of the base mould covers a base area of the container to be processed.

Furthermore the device according to the invention is characterised in that the base mould carrier lift device comprises at least one first damping element for damping and limiting the substantially vertical movement of the base mould carrier in relation to the mould carrier unit. The damping element which can be constructed of several pieces serves firstly to damp the movement of the base mould carrier in relation to the mould carrier unit and preferably secondly also to form an end stop for this movement.

Consequently the device according to the invention comprises a mould carrier holder with a mould carrier unit arranged rotatably or swivellably thereon, with at least two mould carriers and a base mould carrier lift device with base mould carrier arranged thereon for carrying or moving the base mould.

Advantageously a movement of at least one mould carrier and the base mould carrier are coupled together for at least part of the time during opening and/or closing of the blow mould or mould carrier unit.

The base mould carrier lift device in a preferred embodiment has a base unit mobile in relation to a main retaining element and a base carrier immobile in relation thereto, wherein the base mould carrier is itself arranged mobile in relation to the base carrier.

The term immobile here refers in particular to a transport device which transports the entire device. Preferably a multiplicity of such devices can be provided on a common transport device and in particular on a common blow wheel rotating about a specified axis. In addition the device according to the invention can also have a stretch rod which expands the plastic preforms along their longitudinal direction during the moulding process. Advantageously therefore the device according to the invention is part of a blowing station which serves to transform plastic preforms into plastic containers. This blowing station advantageously has a blowing nozzle which expands the plastic preforms into plastic containers. Advantageously the plant described here is a stretch-blowmoulding machine.

The opening and closing of the blow moulds can take place via control curves (arranged stationary) but also via electric or magnetic drives.

Thus the base mould carrier is arranged on the mobile base unit in order to move the base mould in the direction of the mould carrier unit on closing of the mould carrier unit.

In contrast, the mould carrier unit is arranged preferably swivellably on one mould carrier holder, wherein the mould carrier holder and the base mould carrier lift device are connected together, particularly preferably rotationally stationary.

This means that the mould carrier holder and the base mould carrier lift device are preferably formed either from a cohesive or common material or connected together by for example screw or weld connections, such that for example a movement of the mould carrier holder in relation to the base mould carrier lift device is not possible.

The first damping element used for damping and/or limiting the substantially vertical movement of a base mould carrier in relation to the mould carrier unit is preferably arranged on the base carrier of the base mould carrier lift device.

Thus the damping element itself is preferably immobile for example via a retaining block mounted on the base mould carrier lift device so that damping and/or limiting of the movement of the base mould carrier and consequently of the base mould is possible by a further mobile element, the movement of which is consequently reduced and/or hindered and/or slowed by the damping element.

Consequently for example a retaining finger, which is coupled with the base unit of the base mould carrier lift device and moves with this, comprises a stop body, in particular stop bolt, which meets the damping element in the closing process of the mould carrier unit.

Thus by the movement of the base mould carrier or the mobile base unit, the retaining finger with its stop bolt arranged thereon moves substantially upward when the mould carrier unit closes. As a result the stop bolt, which preferably interacts directly with the first damping element, is first slowed in its vertical movement by the first damping element, for example by the stop bolt meeting a pressure force opposing the movement direction, and for example limited after a defined movement.

In a further preferred embodiment a curve lever which is arranged on at least one of the at least two mould carriers and can be moved by the mould carrier has a curve roller which is arranged mobile in a base curve.

When the mould carriers are moved towards each other i.e. the mould carrier unit closes, there is also a specified, preferably substantially horizontal movement of the curve lever which is connected preferably rotationally stationary and immobile with the right-hand mould carrier. As a result the curve roller arranged on the curve lever rolls preferably in or along a guide rail of a base curve, whereby the base curve is drawn or guided or moved upward in the vertical direction.

Consequently the base unit of the base mould carrier lift device is connected with the base curve for movement transfer such that the base unit and the base mould can be moved substantially vertically.

In a further preferred embodiment at least one mould carrier of the mould carrier unit comprises a second damping element, preferably acting damping substantially horizontally, to damp the movement of the closing mould carrier unit. Preferably the first and/or the second damping element has a spring which can itself damp or limit the movement or as a secondary element support a primary element e.g. the hydraulic shock absorber, in damping and/or limiting the movement.

Accordingly the first and/or second damping element is for example a shock absorber.

Furthermore a method is claimed for damped closing of a mould carrier unit and a base mould carrier of a blow mould for forming containers, wherein during movement of a base unit a damping element, which is connected with an immobile base carrier of a base mould carrier lift device, damps the movement of the base unit in that a stop body or stop bolt connected with a mobile base unit of the base mould carrier lift device is moved against the damping element.

It would however also be possible conversely for the damping element to be connected with the mobile base unit and the stop body or stop bolt to be connected with the immobile base carrier.

BRIEF DESCRIPTION OF THE DRAWINGS

Further advantages, objectives and properties of the present invention are explained in more detail with reference to the description below and the enclosed drawings which show for example an embodiment of the device according to the invention.

Components which in the figures correlate at least substantially in function may be marked with the same reference numerals, wherein these components need not be marked in all figures and explained.

The figures show:

Figure 1:
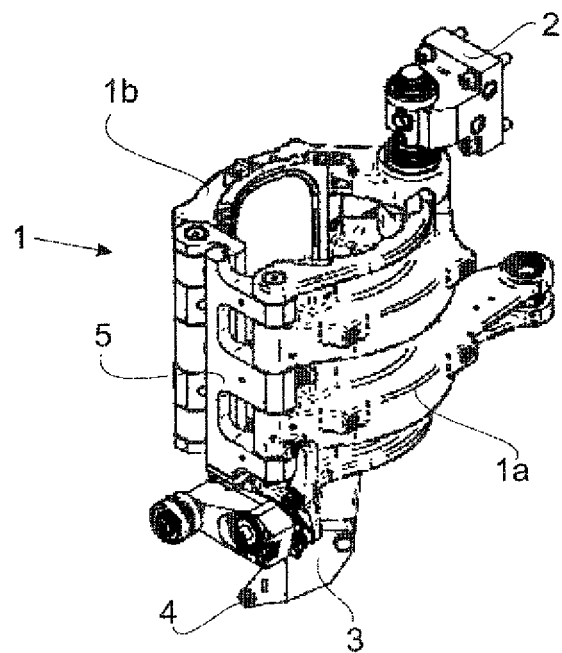
Figure 2:
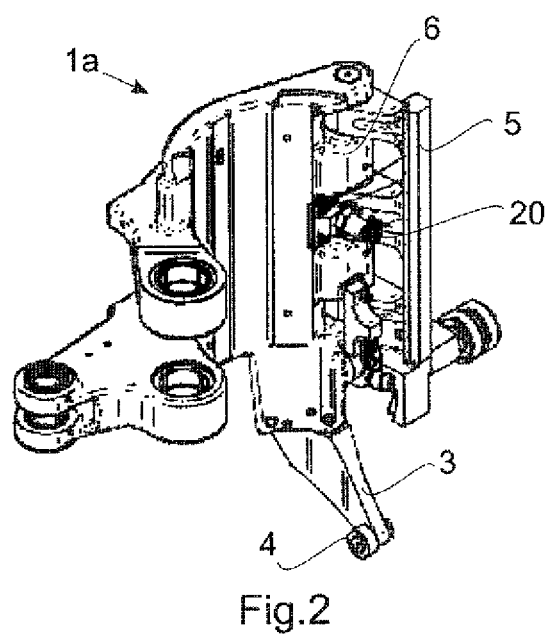
Figure 3:
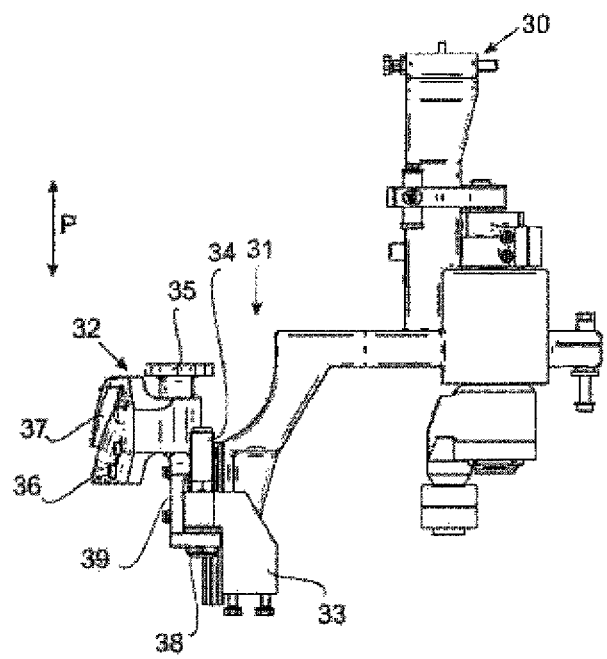
Figure 4:
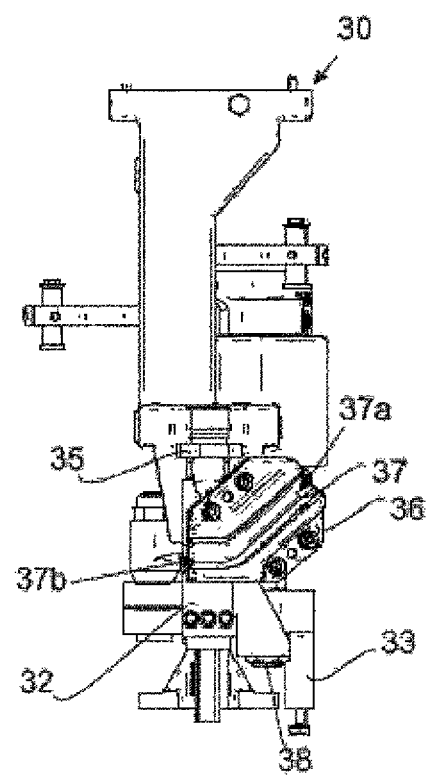
Figure 5:
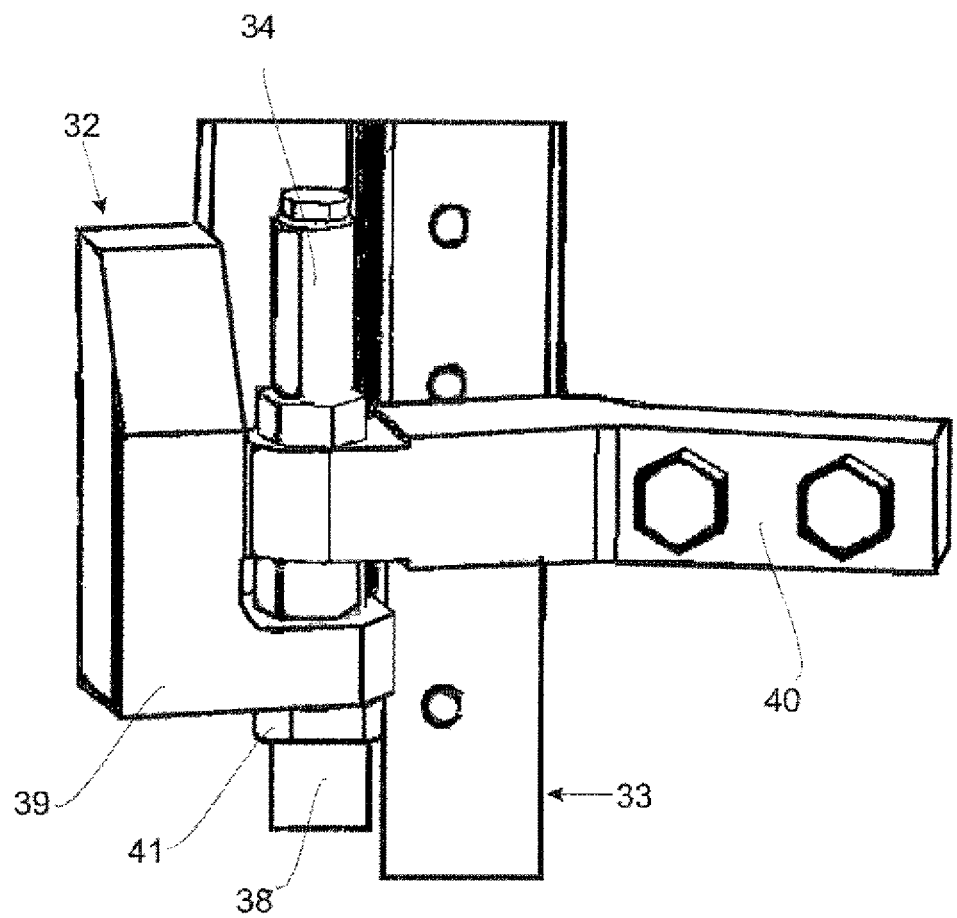

FIG. 1 a principle sketch of a mould carrier unit in closed position;

FIG. 2 a principle sketch of a right-hand mould carrier;

FIG. 3 a principle sketch of a side view of a mould carrier holder with arranged thereon a base mould carrier unit according to an embodiment of the device according to the invention;

FIG. 4 a principle sketch of a front view of a mould carrier holder with arranged thereon a base mould carrier unit according to an embodiment of the device according to the invention; and FIG. 5 a principle sketch of the damping element according to an embodiment of the device according to the invention.

DETAILED DESCRIPTION OF THE DRAWINGS

FIG. 1 shows a mould carrier unit 1 with right-hand mould carrier 1a and left-hand mould carrier 1b in a closed position. I.e. the two mould carriers 1a and 1b engage with each other by means of gripper or holding elements 5 arranged on each mould carrier 1a, 1b in order to enclose a container to be worked or formed. Thus the retaining elements 5 form a locking mechanism. A blow mould which is held by the mould carrier 1a, 1b is not shown here.

The two mould carriers 1a and 1b are preferably arranged swivellable or rotatable about a common axis on a mould carrier holder 2 shown here merely in extract, in order to allow a movement for opening or closing the mould carrier unit 1.

On the right-hand mould carrier 1a is also attached a curve lever 3 with a curve roller 4 attached to the curve lever 3. The curve lever 3 extends substantially in the vertical direction below the right-hand mould carrier 1a downward from this and at the same time in the direction of the second mould carrier 1b. Thus the curve lever 3 substantially describes an L-shape.

In FIG. 2 the right-hand mould carrier 1a already seen in FIG. 1 is shown in more detail. Also the right-hand mould carrier 1a has a damping element 20 which extends substantially horizontally in the direction of the left-hand mould carrier (not shown here). Consequently the damping element 20, which for example can be a shock absorber, is arranged on the face 6 of the right-hand mould carrier 1a such that on the movement of the two mould carriers 1a, 1b directed towards each other, it can damp the closing movement of the mould carrier unit 1 to prevent an impact of the two mould carriers 1a and 1b, in that the swivel movement of the two mould carriers 1a, 1b about the mould carrier holder (not shown here) is braked. The damping element 20 is arranged opposite the swivel axis of the mould carriers 1*a*, 1*b* so that consequently the container to be processed (not shown here) lies between the swivel axis and the damping element 20 for at least part of the time.

It is however also possible for the damping element to be arranged on the left-hand mould carrier 1*b*. The damping element could also be arranged on the same side as said swivel axis in relation to the container.

According to FIG. 1 the damping element 20 is arranged relatively centrally in relation to the vertically extending length of the right-hand mould carrier 1*a*. It is however also conceivable for the damping element 20 to be arranged in the upper or lower area of the face 6. Furthermore it is possible that instead of one damping element, two or more damping elements 20 can be arranged which are distributed along the face 6 of the right-hand mould carrier and/or along the face of the left-hand mould carrier (not shown here).

The principle sketches of FIGS. 3 and 4 each show a mould carrier holder 30 with base mould carrier lift device 31 arranged thereon in different views.

Thus the principle sketch in FIG. 3 shows a side view of the mould carrier holder 30 and the base mould carrier lift device 31 which is composed of a base unit 32 mobile substantially vertical to the mould carrier 30 and a correspondingly rigid base carrier 33 immobile in relation to the mould carrier 30.

On the base carrier 33 is arranged a first damping element 34 for damping and/or limiting the movement of the base unit 32 which moves up and down substantially in the vertical direction (double arrow P) as the mould carrier unit (not shown here) is closed or opened. This movement of the base unit 32 or base mould carrier 35 which transports the base mould (not shown here) in the direction of the mould carrier unit on closing of the mould carrier unit or away from the mould carrier unit on opening of the mould carrier unit, is damped and/or limited by a stop bolt 38 connected via a retaining finger 39 with the moving base 32 and interacting with the damping element 34. The precise sequence during this damping is described with reference to FIG. 5.

The stop bolt 38 or stop body 38 extends consequently preferably in a substantially vertical direction through a region of the retaining finger 39 and a region of the base carrier 33 up to the damping element 34 with which it interacts for damping and/or limiting of the movement. Preferably the retaining bolt here thus also extends parallel to the swivel axis of the mould carrier unit.

A base curve 36 with a guide rail 37 running in the base curve 36 is also arranged on the mobile base unit 32. By engagement and corresponding movement of the curve roller along the curve lever (neither shown here) in the base curve 36 or guide rail 37 or guide groove 37, a vertical lift movement can be achieved of the base unit 32 and consequently the base mould carrier 35 and hence the base mould (not shown here).

FIG. 4 shows a principle sketch of the structure according to FIG. 3 but in front view. The component structure of FIG. 3 has been turned to the right by around 90° for the view in FIG. 4.

FIG. 4 shows clearly that the base curve 36 has a guide rail 37 or a guide groove 37 which extends in a first region 37*a* at a defined angle in the direction of the left-hand mould carrier (not shown here) and accordingly comprises a first region 37*a* running obliquely downwards. The second region 37*b* of the guide rail 37 runs substantially horizontal to the image plane which corresponds approximately to the support surface of the base mould carrier.

Consequently on a closing movement of the base carrier unit (not shown here), the curve roller of the curve lever which is arranged for example rotationally stationary or rigidly on the right-hand mould carrier (see FIG. 1) is guided in the guide rail 37 of the base curve 36 such that the base curve 36 is forced into an upward directed movement. The gradient of the base rail 37 of the base curve 36 consequently defines the deflection or speed with which the base curve is moved up or down.

Consequently a steep gradient of the guide rail 37 or first region 37*a* of the guide rail 37 means the rapid movement of the base curve 36 upward or downward.

After the curve roller has now been moved or pushed or rolled along the first region 37*a* of the guide rail 37, the curve roller now reaches the second region 37*b* of the base curve 36. While the curve roller is rolling along the second region 37*b*, there is no further upward movement of the base curve 36 and consequently no further upward movement of the base mould carrier 35. Now the mould carriers are merely connected together such that the base form is held in the mould carrier unit and is completely surrounded by this in order consequently to form an interior sealed against the environment, in which the containers can be blown and stretched.

In other words the upward movement of the base unit 32 by the closing of the mould carrier unit and the downward movement of the base unit 32 by the opening of the mould carrier unit are initiated in that the curve lever respectively lifts and lowers the base unit 32.

FIG. 5 shows a principle sketch of the damping element 34 according to an embodiment of the invention, wherein the damping element 34 can be a pneumatic, hydraulic or mechanical shock absorber. The damping element 34 is arranged rotationally stationary and immobile or rigidly on a retaining block 40 so that the position or situation of the damping element 34 cannot be changed even in relation to the retaining block 40.

A stop bolt 38 which interacts with the damping element 34 to damp and/or limit the substantially vertical movement of the base unit is also arranged rotationally stationary or immobile or rigidly on a retaining finger 39. The stop bolt 38 is connected with the retaining finger 39 for example via a hexagonal nut 41.

If now because of the movement described above, the base curve (not shown here) is moved upward, there is also an upward movement of the base unit 32 together with the base mould carrier and base mould (neither shown here). Consequently the retaining finger 39 is also moved upward whereby the stop bolt 38 with damping element 34, depending on its structure, counteracts or moves against the damping element 34 whereby the mass of the base unit 32 is braked before reaching its end position.

If for example the damping element 34 is a hydraulic shock absorber, the stop bolt 38 constitutes a piston guided in the cylinder of the shock absorber which must displace a liquid medium, for example oil, against a defined resistance when the piston, i.e. the stop bolt 38, is also moved upward in the cylinder of the shock absorber on an upward movement of the base unit 32.

It is also possible that the damping of the stop bolt is achieved for example by a compression spring such as for example in mechanical shock absorbers. The spring is fitted for example in the cylinder of the damping element 34 such that this is tensioned (compressed) on an upward movement of the base unit 32 and relaxed on a downward movement. A defined movement limitation is then possible for example via this spring if this e.g. runs to block and consequently no further compression of the spring is possible. Thus an upward movement of the base unit is also limited at this point.

As a result of the damping described above of the movement of the base unit 32, an overshoot of the base unit 32 before it reaches its end position can be prevented, while also an end stop is created, limiting the movement of the base unit 32 by the damping element 34 of the device according to the invention.

The applicant reserves the right to claim all features disclosed in the application documents as essential to the invention where novel individually or in combination in relation to the prior art.

LIST OF REFERENCE NUMERALS

1 Mould carrier unit
1a Right-hand mould carrier
1b Left-hand mould carrier
2 Mould carrier holder
3 Curve lever
4 Curve roller
5 Gripper or holding element
20 First horizontally acting damping element
30 Mould carrier holder
31 Base mould carrier lift device
32 Base unit
33 Base carrier
34 Damping element
35 Base mould carrier
36 Base curve
37 Guide rail
37a First region of guide rail
37b Second region of guide rail
38 Stop bolt
39 Retaining finger
40 Retaining block
41 Hexagonal nut
P Double arrow

The invention claimed is:

1. A device for forming containers, wherein the device comprises at least one mould carrier unit for holding blow mould parts, a base mould carrier for holding a base mould, and a base mould carrier lift device for moving the base mould carrier in conjunction with the movement of the mould carrier unit, wherein the mould carrier unit comprises at least two mould carriers which surround the container to be processed at least during a moulding process, and wherein the base mould carrier covers a base area of the container to be treated, wherein the base mould carrier lift device comprises at least one first damping element for damping and limiting vertical movement of the base mould carrier in relation to and in direction to the mould carrier unit.

2. The device according to claim 1, wherein the base mould carrier lift device comprises a base unit mobile in relation to a main holding element and a base carrier immobile thereto, wherein the base mould carrier is arranged mobile in relation to the base carrier.

3. The device according to any of claim 1, wherein the mould carrier unit is arranged swivellably on a mould carrier holder, wherein the mould carrier holder and the base mould carrier lift device are connected together rotationally stationary.

4. The device according to any of claim 2, wherein the first damping element is arranged on the base carrier of the base mould carrier lift device.

5. The device according to any of claim 2, wherein a retaining finger, which is coupled with the base unit of the base mould carrier lift device and moves with this, comprises a stop bolt which meets the damping element on the closing movement of the mould carrier unit.

6. The device according to claim 1, wherein a curve lever which is arranged on at least one of the at least two mould carriers and can be moved by the mould carrier, comprises a curve roller which is arranged mobile in a base curve.

7. The device according to claim 6, wherein the base unit of the base mould carrier lift device for movement transfer is connected with the base curve such that the base unit and the base mould are mobile substantially vertically.

8. The device according to claim 1, wherein at least one mould carrier of the mould carrier unit comprises a second damping element which substantially acts damping horizontally to damp the movement of the closing mould carrier unit.

9. The device according to claim 1, wherein the first and/or the second damping element has a spring.

10. The device according to claim 1, wherein the first and/or the second damping element is a shock absorber.

11. A method for damped closing of a device for forming containers including a mould carrier unit and a base mould carrier of a blow mould as claimed in claim 1, wherein during the movement of a base unit a damping element which is connected with an immobile base carrier of a base mould carrier lift device damps the movement of the base unit, in that a stop bolt connected with a moving base unit of the base mould carrier lift device is moved against the damping element.

* * * * *